United States Patent [19]

Chen et al.

[11] Patent Number: 4,803,186
[45] Date of Patent: Feb. 7, 1989

[54] SHAPE SELECTIVE CRYSTALLINE SILICATE ZEOLITE CONTAINING INTERMETALLIC COMPONENT AND USE AS CATALYST IN HYDROCARBON CONVERSIONS

[75] Inventors: Nai Y. Chen, Titusville, N.J.; Thomas F. Degnan; Paul B. Weisz, both of Yardley, Pa.

[73] Assignee: Mobil Oil Corporation, New York, N.Y.

[21] Appl. No.: 938,095

[22] Filed: Dec. 4, 1986

[51] Int. Cl.$^4$ .................. B01J 29/10; B01J 29/28
[52] U.S. Cl. .................................. 502/66; 502/74
[58] Field of Search ........................... 502/66, 74

[56] References Cited

U.S. PATENT DOCUMENTS 4,451,572  5/1984  Cody ........................................ 502/62
4,507,401  3/1985  Dubois et al. ........................... 502/242

OTHER PUBLICATIONS

Dubois et al., "Small-Molecule Chemisorption on NiSi$_2$: Implications for Heterogeneous Catalysis", *J. Am. Chem. Soc.*, 105, 365–369 (1983).

Nuzzo et al., "Derivated, High Surface Area, Supported Nickel Catalysts," *Journal of Catalysis*, 85, 267–271 (1984).

Wallace, "Intermetallic Compounds in Catalysis", *Chemtech*, 752–754 (Dec. 1982).

*Primary Examiner*—Carl F. Dees
*Attorney, Agent, or Firm*—Alexander J. McKillop; Michael G. Gilman; Dennis P. Santini

[57] ABSTRACT

The catalytic properties of a metal-containing shape selective crystalline silicate zeolite are significantly improved by converting said metal to an intermetallic compound. Thus, for example, zeolite beta containing the intermetallic component platinum zeolite demonstrates improved catalytic properties for dewaxing a hydrocarbon feedstock compared to zeolite beta containing platinum metal alone.

27 Claims, 4 Drawing Sheets

Fig. 2
XRD SPECTRA OF LARGE CRYSTALLITE PT
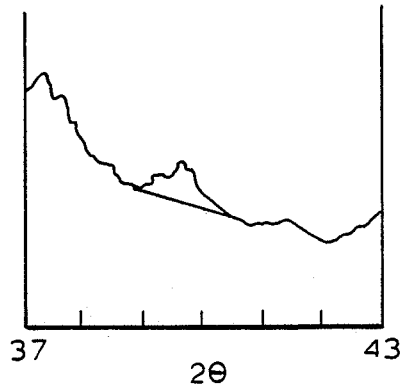
(a) HEXAMETHYLDISILANE TREATED SAMPLE
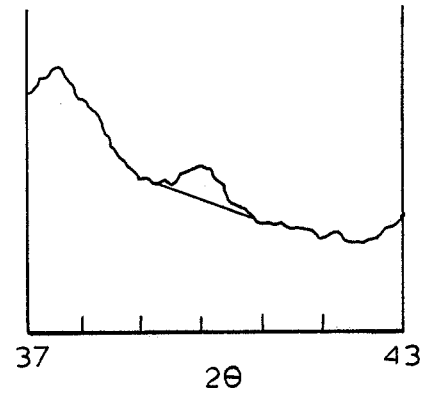
(b) UNTREATED SAMPLE
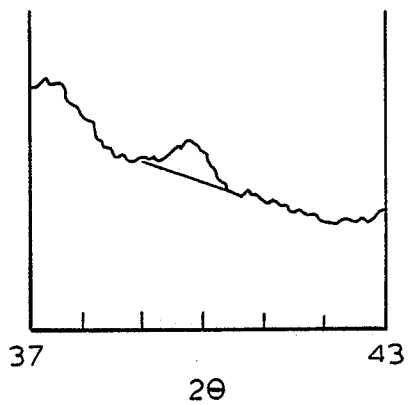
(c) STEAMED HEXAMETHYLDISILANE TREATED SAMPLE
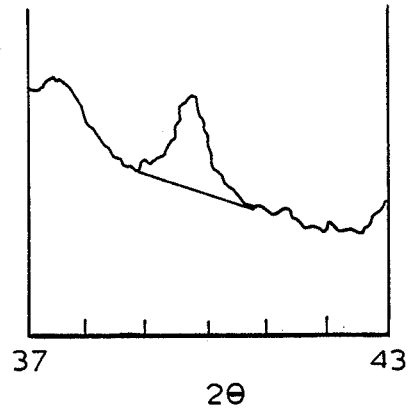
(d) STEAMED UNTREATED SAMPLE

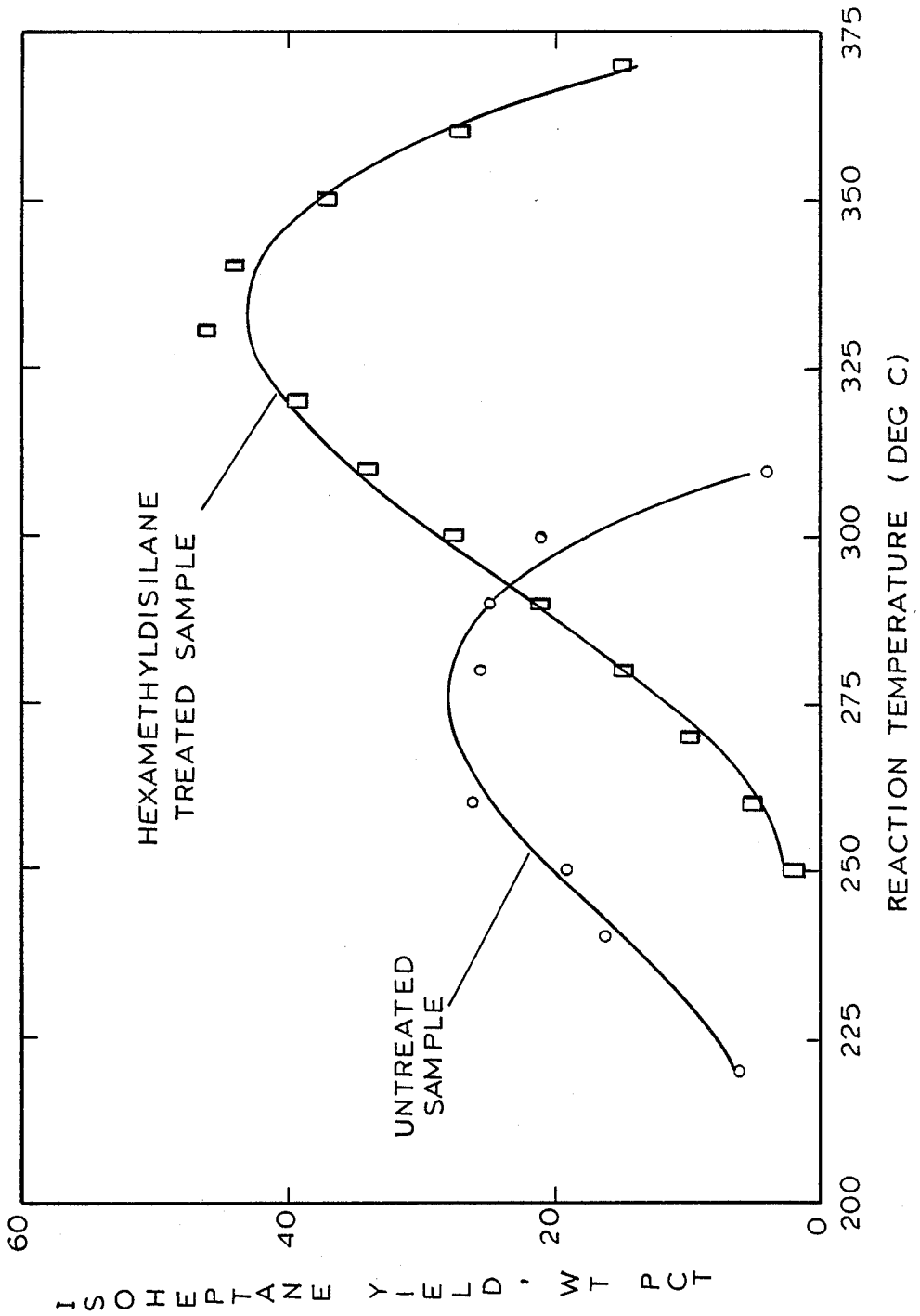

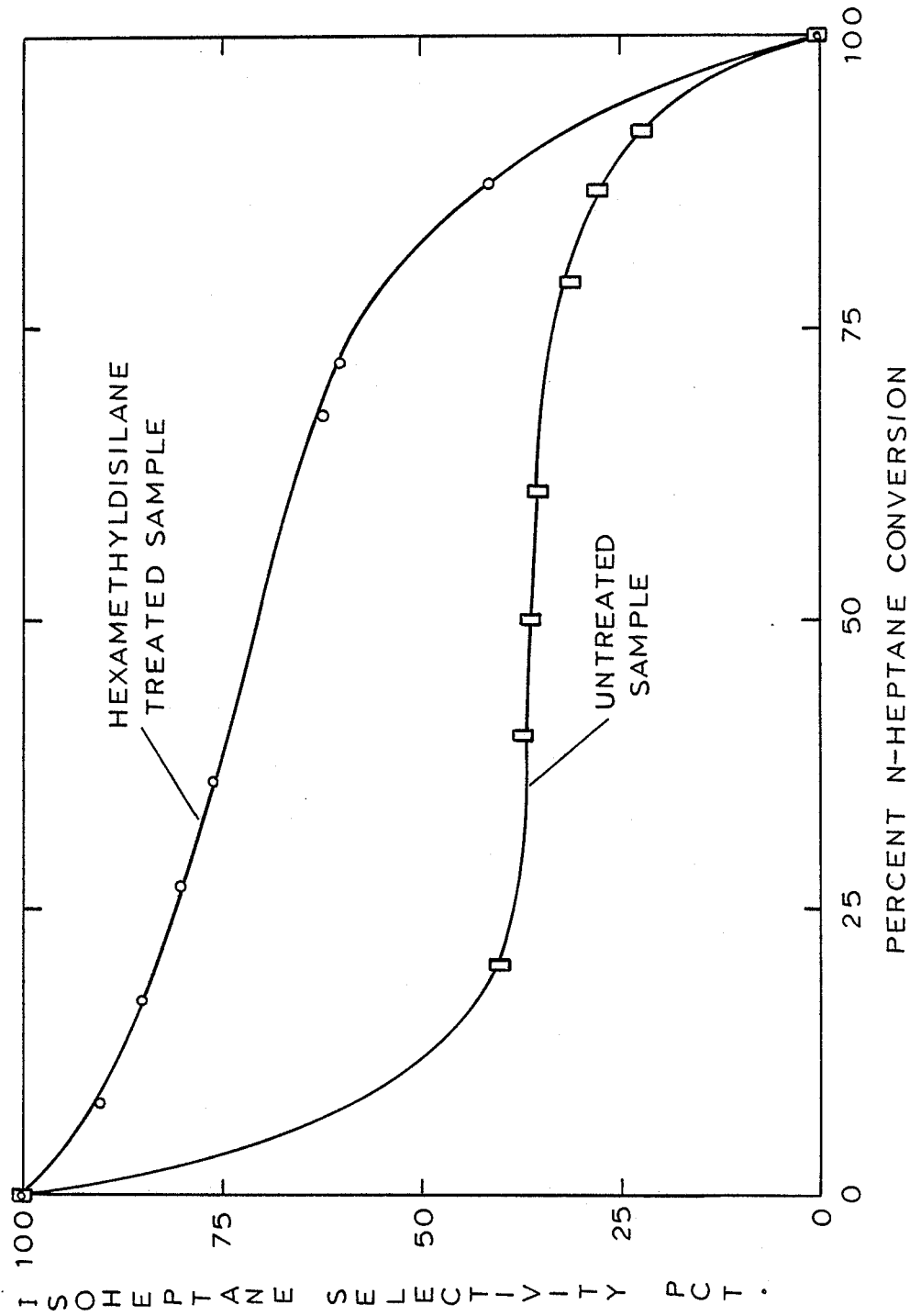

SHAPE SELECTIVE CRYSTALLINE SILICATE ZEOLITE CONTAINING INTERMETALLIC COMPONENT AND USE AS CATALYST IN HYDROCARBON CONVERSIONS

BACKGROUND OF THE INVENTION

This invention relates to shape selective crystalline silicate zeolite catalysts and their use in hydrocarbon conversion processes. More particularly, this invention relates to such zeolites containing an intermetallic component, e.g., HZSM-5 containing platinum silicide, and to the use of such catalysts for a variety of hydrocarbon conversions, e.g., isomerization of waxy paraffins.

Zeolitic materials, both natural and synthetic, have been demonstrated in the past to have catalytic properties for various types of hydrocarbon conversion. Certain zeolitic materials are ordered, porous crystalline silicates having a definite crystalline structure as determined by X-ray diffraction within which there are a number of smaller cavities which may be interconnected by a number of still smaller channels or pores. These cavities and pores are uniform in size within a specific zeolitic material. Since the dimensions of these pores are such as to accept for absorption molecules of certain dimensions while rejecting those of larger dimensions, these materials are said to be "shape selective" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as $Ca/2$, $Sr/2$, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The space between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite Z (U.S. Pat. No. 2,882,243), zeolite X (U.S. Pat. No. 2,882,244, zeolite Y (U.S. Pat. No. 3,130,007), zeolite ZK-5 (U.S. Pat. No. 3,247,195), zeolite beta, (U.S. Pat. No. 3,308,069), zeolite XK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 3,016,245), ZSM-38 (U.S. Pat. No. 4,046,859) and zeolite ZSM-23 (U.S. Pat. No. 4,076,842) merely to name a few.

These and other zeolites have been widely investigated as catalysts for a variety of hydrocarbon conversion processes including isomerization of waxy paraffins. Thus, for example, U.S. Pat. No. 4,419,220 describes a process for catalytically dewaxing a variety of feedstocks containing waxy normal and slightly branched paraffins over zeolite beta containing a hydrogenation component such as platinum or palladium. During the processing, the n-paraffins become isomerized to iso-paraffins and the slightly branched paraffins undergo isomerization to more highly branched aliphatics resulting in product of reduced pour point.

The modification of zeolites X and Y optionally containing a hydrogenating metal component with an organosilane capable of entering the pores, or channels, of these zeolites is known from U.S. Pat. No. 4,451,572. The organosilane modified zeolite either before or after the deposition of the optional metal component, is heated, usually at above 300° C., in an inert or reducing atmosphere to form a stable surface resulting from condensation/polymerization of the silated surface. The amount of organosilane employed is such as to result in significant constriction of the pore diameters and a consequent reduction in pore volume. The modified zeolite is said to be useful in hydrodewaxing, selective paraffin cracking, paraxylene isomerization and the preferential acid catalyzed reactions of linear or slightly branched paraffins or olefins.

U.S. Pat. No. 4,507,401 describes supported intermetallic compounds produced by a two-step process. In the first step, a supported metal is formed, for example, by solvating a metallic salt such as nickel nitrate and applying it to a support medium. The treated support body is then heated in the presence of a reducing agent to produce elemental metal. The supported metal is then treated with a reactive organometallic or metal hydride compound to yield a supported intermetallic compound. The catalysts are said to be useful for the preferential catalysis of dehydrogenation rather than hydrogenation processes.

SUMMARY OF THE INVENTION

It has now been discovered that the catalytic activity of shape selective crystalline silicate zeolites containing a metallic component can be significantly improved by converting said metallic component to an intermetallic compound without, however, significantly reducing either the average pore diameter or average pore volume of the zeolite.

Thus, in accordance with the present invention, a process is provided for modifying a metal-containing shape selective crystalline zeolite which comprises contacting said zeolite under substantially anhydrous conditions with a reactive, volatile inorganic metal compound or a volatile organometallic compound capable of penetrating into the pores of the zeolite. These compounds are chosen to contain a metal atom or atoms from the group including boron, aluminum, gallium, indium, silicon, germanium and tin. The reaction of the metal component of the zeolite with the foregoing metal compounds under reducing conditions produces intermetallic materials with desirable properties. For example, if a zeolite-supported platinum is reacted with silane, a platinum silicide is produced. The intermetallic compounds can be represented by the formula $A_xB_y$ where A is the active catalytic metal associated with the zeolite, B is the organometallic based compound or metal hydride and x and y are integers or fractional values.

The intermetallic compound-containing zeolites resulting from the aforedescribed process exhibits greater useful life due to an enhanced ability to resist agglomeration of the catalytically active metal species. In addition, these catalysts possess heightened catalytic activity for a variety of hydrocarbon conversion processes such as the isomerization process specifically illustrated below.

DESCRIPTION OF THE PREFERRED EMBODIMENTS

Figure 1:
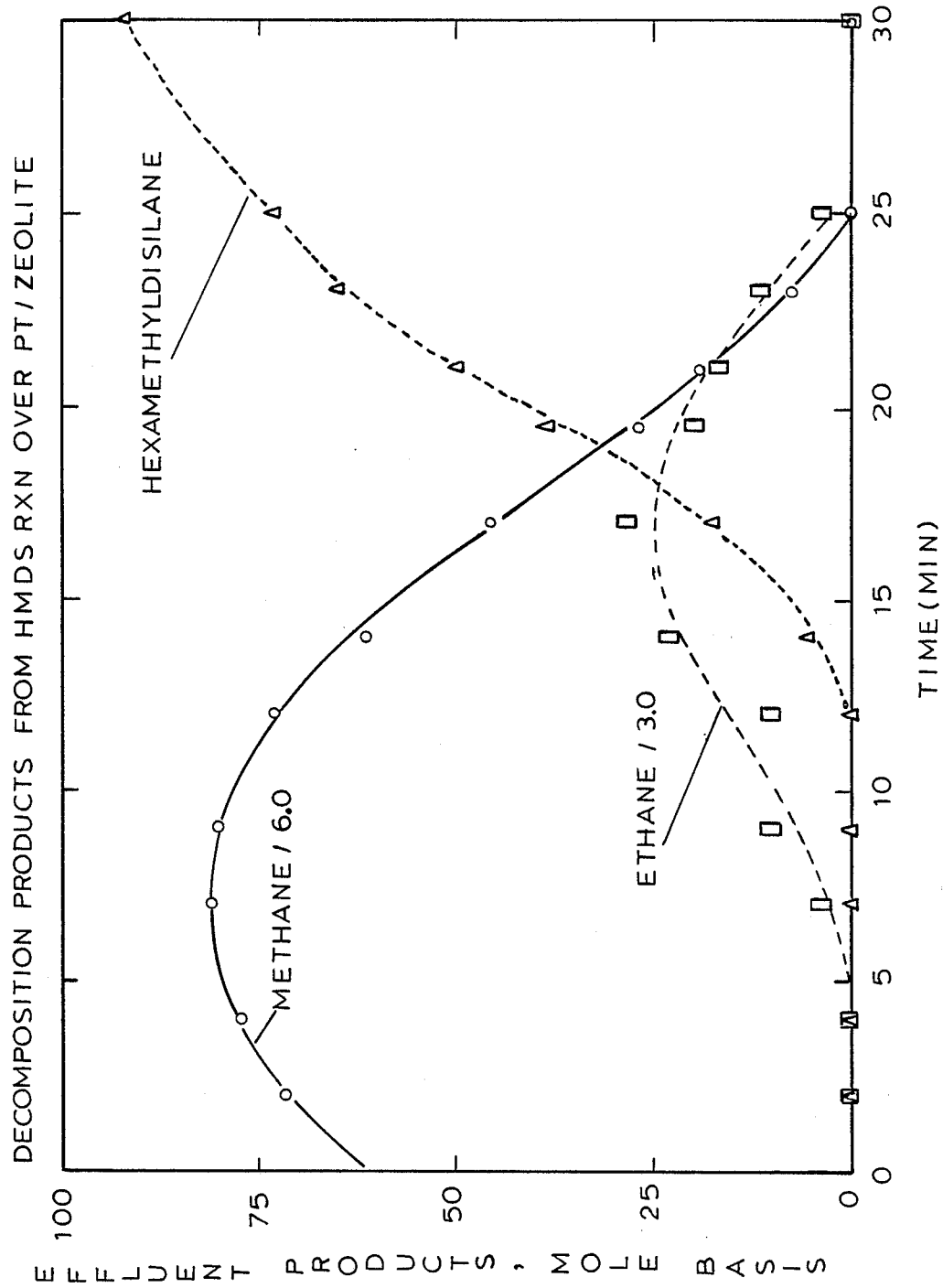

The shape selective metal-supported crystalline silicate zeolites which can be modified in accordance with the present invention possess a silica to alumina molar ratio of at least 12, a constraint index of from about 1 to about 12 and an acid cracking activity of about 50–300. Representative of such catalysts are zeolite beta and the ZSM-5 type zeolites including ZSM-5 itself, ZSM-11, ZSM-12, ZSM-23, ZSM-35 and ZSM-38. Zeolite beta is disclosed in U.S. Pat. No. 3,308,069; ZSM-5 is disclosed and claimed in U.S. Pat. No. 3,702,886 and U.S. Pat. No. Re. 29,948; ZSM-11 is disclosed and claimed in U.S. Pat. No. 3,709,979. Also, see U.S. Pat. No. 3,832,449 for ZSM-12; U.S. Pat. No. 4,076,842 for ZSM-23; U.S. Pat. No. 4,016,245 for ZSM-35 and U.S. Pat. No. 4,046,829 for ZSM-38. The disclosures of these patents are incorporated herein by reference. Other pentasil catalysts which can undergo modification as described herein include a variety of medium pore (about 5 to 9 angstroms) siliceous materials such as borosilicates, ferrosilicates, and/or aluminosilicates such as are disclosed in U.S. Pat. Nos. 4,414,423 and 4,417,088, both of which are incorporated herein by reference.

Optionally, the surface activity of these and similar zeolite catalysts can be modified by pretreatment, e.g., with a neutralizing base as disclosed in U.S. Pat. No. 4,520,221 which reduces the surface acidity of the zeolite, or by any of a variety of procedures involving removal of framework aluminum, e.g., the dealuminizing methods described in U.S. Pat. No. 3,442,795 and U.K. Pat. No. 1,058,188 (hydrolysis and removal of aluminum by chelation); U.K. Pat. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); U.S. Pat. No. 4,503,023 German and U.S. Pat. No. 2,510,740 (treatment of zeolite with chlorine or chlorine-containing gases at high temperatures); Netherlands Patent No. 7,604,264 (acid extraction), Japan Patent No. 43/101,003 (treatment with EDTA or other materials to remove aluminum) and J. Catalysis, 54, 295 (1978) (hydrothermal treatment followed by acid extraction).

The zeolite to undergo modification in accordance with the process of this invention is associated with one or more metal components A, e.g., a hydrogenation-dehydrogenation noble metal such as platinum, palladium or rhodium.

Combinations of noble metals such as platinum, rhenium, platinum-palladium, platinum-iridium or platinum-iridium-rhenium together with combinations with non-noble metals, particularly of Groups VIA and VIIIA are of interest, particularly with metals such as cobalt, nickel, vanadium, tungsten, titanium and molybdenum, for example, platinum-tungsten, platinum-nickel or platinum-nickel-tungsten.

The metal can be incorporated into the catalyst by any suitable method such as impregnation or exchange onto the zeolite. The metal can be incorporated in the form of a cationic, anionic or neutral complex such as $Pt(NH_3)_4 2+$ and cationic complexes of this type will be found convenient for exchanging metals onto the zeolite. Anionic complexes such as the vanadate or metatungstate ions are useful for impregnating metals into the zeolites.

The amount of metal component is suitably from 0.01 to 10 percent by weight, normally 0.1 to 5 percent by weight, although this will, of course, vary with the nature of the component, less of the highly active noble metals, particularly platinum, being required than of the less active base metals.

Base metal components such as cobalt, nickel, molybdenum and tungsten can be subjected to a pre-sulfiding treatment with a sulfur-containing gas such as hydrogen sulfide in order to convert the oxide forms of the metal to the corresponding sulfides.

The metal-containing zeolite, preferably substantially in the hydrogen form (i.e., with an alkali metal content of less than about 4 wt. percent and preferably less than about 1.5 wt. percent), is treated with a reactive organometallic composition or inorganic metal compound, e.g., a metal hydride, which is volatile, e.g., one having a vapor pressure of at least 0.01 Torr at the reaction temperature which is to be employed. This reactive composition should contain atom(s) B which include boron, aluminum, gallium, indium, silicon, germanium, tin, or combinations of these atoms. It is possible to form a large variety of intermetallic compounds utilizing metal(s) A and a reactive gas containing metal(s) B. Not all combinations of A and B necessarily form supported intermetallic compositions. However, if an intermetallic composition of the form $A_xB_y$ exists in bulk, then a supported intermetallic of the form $A_zB_w$ (where z and w are not necessarily equivalent to x and y, respectively) is producible by forming the zeolite-supported metal(s) A and then reacting it with a gas or gases having the desired metal(s) B. (The existence of a particular intermetallic bulk compound is easily determined by consulting the extensive phase diagrams published in, for example, W. G. Moffatt, *The Handbook of Binary Phase Diagrams*, General Electric Company, Schenectady, N.Y. 1978.)

To ensure that a desired intermetallic compound is formed, the reactive compound should satisfy certain criteria. First, the reactive compound should be volatile, i.e., have a vapor pressure (at the reaction temperature employed to produce the intermetallic compound) of greater than 0.01 Torr, preferably greater than 0.1 Torr. If a compound with a lower volatility is employed, it is difficult to supply sufficient gas for reaction with the supported Group VIII metal. Generally, for adequate reaction to occur, partial pressures above 0.01 Torr, preferably above 0.1 Torr, are utilized.

The reactive gas should react sufficiently with the supported metal so that sufficient intermetallic composition is formed to yield catalytic activity which differs from that of metal A. Generally very small amounts of intermetallic composition do afford useful catalytic activity. In general, an amount of reactive gas not significantly exceeding a stoichiometric amount should be used. Stated another way, the amount of reactive gas employed should not be such as to result in an appreciable reduction in the diameter of the zeolite pore or pore volume.

The reactivity of the gas depends not only on its specific composition but also on the temperature employed for reaction, the concentration of the reactive gas, and the presence of other agents, such as hydrogen, carbon monoxide or other reducing gas in the reaction stream. Gases with relatively high reactivity are easily obtainable for boron, aluminum, silicon, germanium, gallium, indium and tin. Volatile inorganic and organic silanes and germanes are preferred. Inorganic silane compounds that are useful include silane, disilane, trisilane, tetrasilane, bromosilane, bromotrichlorosilane, dibromosilane, dibromodichlorosilane, trichlorosilane, trifluorosilane, silicontetrachloride and hexafluorodisilane. Examples of organosilanes which can be used are hexamethyldisilane, tetramethylsilane, methylsilane, dimethylsilane, trimethylsilane, ethyltrimethylsilane, ethyldimethylsilane, and other short chain alkyl silanes. Examples of useful inorganic germanium compounds are germane, digermane, trigermane, germane imide, germanium tetrabromide, germanium dichloride, germanium tetrachloride, and germanium oxychloride. Examples of useful organogermanium compounds are hexamethyldigermane, tetramethylgermane, methylgermane, dimethylgermane, trimethylgermane, ethyltrimethylgermane, ethyldimethylgermane, and other short chain alkyl germanes.

For gases which upon reaction liberate carbon containing entities, e.g., methyl groups from hexamethyldigermane, certain precautions should be taken. In particular, a reducing gas should be present to prevent the formation of carbonaceous deposits on the catalyst body. Typically, reducing agent partial pressures, e.g., hydrogen pressures greater than 1 Torr, are suitable. In a preferred embodiment, a gas having a metal-metal or metal-hydrogen bond, such as silane or disilane, is employed. These bonds are readily cleaved on the supported metal surface resulting in a rapid reaction between the reactive metal and the supported metal. A control sample is easily utilized to determine an appropriate temperature, pressure, and reaction time for a given reactive gas to yield the desired intermetallic composition. Generally, temperatures in the range 50 to 600 degrees C. employed in conjunction with typical partial pressures greater than 0.01 Torr, preferably greater than 0.1 Torr, yield suitable results. (Although the discussion has dealt with the use of one reactive gas, combinations of intermetallic compounds or higher intermetallic compounds, e.g., ternaries, are producible if the supported metal(s) are reacted with a mixture of gases.)

The reaction of the gas with the zeolite-supported metal is performed in conventional equipment. The particular conditions employed to yield a specific composition of intermetallic compound is easily determined by utilizing a control sample. (The composition of the intermetallic compound produced is easily probed utilizing conventional analytical techniques such as ESCA, X-ray fluorescence and quantitative elemental analysis.)

The intermetallic compound-containing zeolites of the present invention are useful as catalysts for a variety of organic, e.g., hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

It may be desirable to incorporate the catalysts herein in another material resistant to the temperature and other conditions employed for foregoing conversions. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calcination, acid treatment or chemical modification.

The catalysts can also be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely with the zeolite content ranging from between 1 to 99, more usually 5 to 80, percent by weight of the composite. The matrix may itself possess catalytic properties, generally of an acidic nature.

The following examples are further illustrative of the invention.

EXAMPLE 1

A platinum-containing zeolite beta was prepared in the manner described in U.S. Pat. No. 3,308,069. Following the preparative procedure described therein, as-crystallized zeolite beta was composited with alumina, calcined in nitrogen to 538° C. for 3 hours followed by exchange with $NH_4NO_3$ under anhydrous conditions. The base-exchanged zeolite was then calcined in air to 538° C. for 3 hours, exchanged with $Pt(NH_3)_4^{2+}$ to provide 0.6 weight percent platinum and calcined to 350° C. in air for 3 hours. This catalyst was then treated with hexamethyldisilane, $(CH_3)_6Si_2$, by first heating the catalyst to 300° C. in hydrogen to reduce the platinum and then passing 0.12 g hexamethyldisilane/g catalyst over the catalyst in $H_2$ at 300° C. The silane compound was introduced by injecting the compound upstream of the catalyst over the course of 30 minutes. Throughout the treatment, the hydrogen flow rate was maintained at 400 cc/min. The conversion of hexamethyldisilane was monitored by sampling the effluent stream for decomposition products. FIG. 1 charts the conversion of hexamethyldisilane over the course of the treatment as determined by GC-FID analysis of the effluent stream. Approximately 55 mg/g of the compound was converted over the catalyst before breakthrough of the hexamethyldisilane occurred. This corresponds to a mole Si/mole Pt ratio of 20.3 or a mole Si/mole exposed Pt ratio of 22.5 based on a previous Pt dispersion measurement of 90%. Elemental analysis of the treated and untreated catalysts showed that the silicon content increased from 29.09 wt.% to 31.11 wt.% following the treatment. This is equivalent to the deposition onto the catalyst of 72% of the charged silicon largely in the form of the intermetallic compound platinum silicide.

EXAMPLE 2

This example demonstrates the superior stability of a platinum silicide-containing zeolite beta prepared as in Example 1 compared to that of essentially the same zeolite beta which has not undergone modification.

Well dispersed platinum is known to agglomerate upon treatment with even low partial pressures of water (>50 torr) at elevated temperatures (>350° C.) To evaluate the stability of platinum-containing catalysts the x-ray diffraction (XRD) spectra of the platinum located on a series of catalysts prepared from the same 0.6% platinum on alumina bound zeolite beta described above were compared. Areas under the XRD spectra in the 37° to 43° 2 theta range are known to be a quantitative indicator of large agglomerate and therefore poorly dispersed platinum.

Catalyst A was prepared as described above in Example 1. Catalyst B was prepared by omitting the hexamethyldisilane treatment step but following the same reduction procedure described above. Catalysts C and D were prepared by treating Catalysts A and B, respectively, with pure steam at 538° C. for 17 hours. FIGS. 2a and 2b and Table 1 below show that the XRD areas of Catalysts A and B are equivalent.

TABLE 1

Comparison of Amount of Large Crystallite Platinum On Untreated and Hexamethyldisilane Treated Alumina Bound Platinum/Zeolite Beta Samples

| Catalyst | Catalyst Description | % Large Crystallite Pt[1] |
|---|---|---|
| A | Hexamethyldisilane-treated 0.6 wt. % Platinum/Zeolite Beta | 5.1 |
| B | Untreated 0.6 wt. % Platinum/Zeolite Beta | 5.1 |
| C | Steamed[2] Hexamethyldisilane-treated 0.6 wt. % Platinum/Zeolite Beta | 5.4 |
| D | Steamed[2] 0.6 wt. % Platinum/Zeolite Beta | 13.1 |

[1]Expressed as wt. % of all platinum present
[2]Steamed for 17 hours at 538° C., in 14.7 psia $H_2O$.
All catalysts were reduced at 300° C. for 1 hour before the stated treatments.

These results show that treatment with hexamethyldisilane did not alter the original dispersion of the catalyst. FIGS. 2c and 2d and Table 1 show that while the steaming had no effect on the platinum in the hexamethyldisilane treated sample, the amount of large crystal platinum (>75A) in the untreated sample increased by a factor of 2.5. Thus, the effect of the treatment with the silane compound was to stabilize the platinum under even very severe hydrothermal conditions.

EXAMPLE 3

This example demonstrates the use of Catalyst A of Example 2 (illustrative of a catalyst modified in accordance with the invention) in the isomerization of n-heptane and compares the isomerization with that carried out employing Catalyst B of Example 2 (unmodified catalyst).

Conditions of the isomerization were as follows:

| | |
|---|---|
| GHSV | $2.4 \times 10^4 \, hr^{-1}$ |
| $H_2/n-C_7$ (molar) | 20:1 |
| Pressure | 1 atm |
| Temperature | 200° to 370° C. |

The results of these runs are shown in FIGS. 3 and 4. FIG. 3 plots the isoheptane yield and n-heptane conversion data against temperature for the disilane treated catalyst (Catalyst A) and untreated catalyst (Catalyst B). The maximum isomer yield of Catalyst A was higher than that of Catalyst B (43% compared to 25%) under the same reaction conditions.

FIG. 4 compares the isomerization selectivities of the two catalysts. Isomerization selectivity is defined herein as:

$$\text{Selectivity} = \frac{\% \text{ Conversion to Isoheptanes} \times 100}{\% \text{ Conversion to Isoheptane and Other Products}}$$

These data show that over the entire range of n-heptane conversion, the hexamethyldisilane treated catalyst was significantly more selective than the untreated catalyst for the isomerization reaction.

What is claimed is:

1. A hydrocarbon conversion catalyst for performing a variety of hydrocarbon conversion, comprising:
   (a) an acidic zeolite catalyst for hydrocarbon cracking and conversion; and
   (b) a hydrogenation-dehydrogenation intermetallic catalytic component contained within said zeolite, whereby said hydrocarbon conversion catalyst is resistant to agglomeration of the intermetallic catalytic component.

2. The hydrocarbon conversion catalyst recited in claim 1, wherein the intermetallic component comprises:
   (a) a hydrogenation-dehydrogenation first metal catalyst; and
   (b) a second metal selected from the group consisting of silicon and germanium.

3. The catalyst recited in claim 2, wherein said hydrogenation-dehydrogenation first metal includes a noble metal.

4. The hydrocarbon conversion catalyst recited in claim 3, wherein said hydrogenation-dehydrogenation first metal is selected from the group consisting of platinum, palladium, rhenium, platinum- palladium, platinum-iridium and platinum-iridium-rhenium.

5. The hydrocarbon conversion catalyst recited in claim 3, wherein said noble metal is combined with a base metal.

6. The hydrocarbon converison catalyst recited in claim 35, wherein said zeolite retains at least about 90% of its original pore volume.

7. The hydrocarbon conversion catalyst recited in claim 1, wherein said zeolite comprises:
   (a) a silica to alumina molar ratio of at least 12;
   (b) a constraint index from about 1 to about 12; and
   (c) an acid cracking activity from about 50 to about 300.

8. The hydrocarbon conversion catalyst recited in claim 7, wherein said zeolite includes zeolite beta, and said zeolite retains at least about 90% of its original pore volume.

9. The hydrocarbon conversion catalyst recited in claim 8, wherein said intermetallic component comprises
   (a) a hydrogenation-dehydrogenation first metal catalyst selected from the group consisting of platinum, palladium, rhenium, platinum-palladium, platinum-iridium and platinum-iridium-rhenium; and
   (b) a second metal selected from the group consisting of silicon or germanium.

10. The hydrocarbon conversion catalyst recited in claim 9, wherein said hydrogenation-dehydrogenation intermetallic catalytic component includes platinum silicide.

11. The hydrocarbon conversion catalyst recited in claim 7, wherein said zeolite includes a ZSM-5 catalyst.

12. The hydrocarbon conversion catalyst recited in claim 11, wherein said zeolite retains at least about 90% of its original pore volume.

13. The hydrocarbon conversion catalyst recited in claim 11, wherein said intermetallic component comprises:
   (a) a hydrogenation-dehydrogenation first metal catalyst selected from the group consisting of platinum, palladium, rhenium, platinum- palladium, platinum-iridium and platinum-iridium-rhenium; and
   (b) a second metal selected from the group consisting of silicon and germanium.

14. The hydrocarbovn conversion catalyst recited in claim 13, wherein said hydrogenation-dehydrogenation catalytic intermetallic component includes platinum silicide.

15. The hydrocarbon conversion catalyst recited in claim 1, wherein the surface acidity of said zeolite is reduced by said hydrogenation-dehydrogenation catalytic intermetallic component.

16. A process for preparing a hydrocarbon conversion catalyst for performing a variety of hydrocarbon conversions, comprising:
   (a) contacting a hydrogenation-dehydrogenation metal-containing acidic zeolite catalyst with a volatile inorganic metal compound or a volatile organometallic compound under anhydrous conditions in a reducing atmosphere and in an amount which is calculated to avoid significant reduction in pore volume of the zeolite; and
   (b) forming a hydrogenation-dehydrogenation intermetallic catalytic compound within the zeolite from a reaction between the hydrogenation-dehydrogenation metallic catalyst contained within the zeolite and the volatile inorganic metal compound or the volatile organometallic metal compound,
whereby the resulting hydrocarbon conversion catalyst is resistant to agglomeration of the intermetallic component.

17. The process of claim 16, wherein said inorganic metal compound or organometallic compound includes silicon or germanium.

18. The process of claim 17, wherein said inorganic metal compound is selected from the group consisting of silane, disilane, trisilane, tetrasilane, bromosilane, bromotrichlorosilane, dibromosilane, dibromodichlorosilane, trichlorosilane, trifluorosilane, silicontretrachloride and hexafluorodisilane.

19. The process of claim 17, wherein said organometallic compound is selected from the group consisting of hexamethylodisilane, tetramethylsilane, methylsilane, dimethylsilane, trimethylsilane, ethyltrimethylsilane and ethyldimethylsilane.

20. The process of claim 17, wherein said inorganic metal compound is selected from the group consisting of germane, digermane, trigermane, germane imdie, germanium tetrabromide, germanum dichloride, germanium tetrachloride and germanium oxychloride.

21. The process of claim 17, wherein said organometallic compound is selected from the group consisting of hexamethyligermane, tetramethylgermane, methylgermane, dimethylgermane, trimethylgermane, ethyltrimethylgermane and ethyldimethylgermane.

22. The process of claim 16, wherein said zeolite includes zeolite beta containing a hydrogenation-dehydrogenation metal catalyst component.

23. The process of claim 22, wherein said hydrogenationdehydrogenation metal catalyst component is selected from the group consisting of platinum, palladium, rhenium, platinumpalladium, platinum-iridium and platinum-iridium-rhenium.

24. The process of claim 23, wherein said inorganic compound or organometallic compound includes silicon or germanium.

25. The process of claim 16, wherein said zeolite incldues ZSM-5 containing a hydrogenation-dehydrogenation metal catalyst component.

26. The process of claim 25, wherein said hydrogenation-dehydrogenation metal catalyst component is selected from the group consisting of platinum, palladium, rhenium, platinum-palladium, platinum-iridium and platinum-iridium-rhenium.

27. The process of claim 26, wherein said inorganic compound or organometallic compound includes silicon or germanium.

* * * * *